United States Patent [15] 3,662,591
Bons [45] May 16, 1972

[54] TUBE TORQUING DEVICE
[72] Inventor: Ido A. Bons, Duarte, Calif.
[73] Assignee: Whittaker Corporation
[22] Filed: Sept. 18, 1970
[21] Appl. No.: 73,425

[52] U.S. Cl. .................................................. 73/99, 73/103
[51] Int. Cl. .......................................................... G01n 3/22
[58] Field of Search .............................. 73/99, 103; 74/99

[56] References Cited

UNITED STATES PATENTS

| 3,103,984 | 9/1963 | Ellis et al. | 177/211 |
| 1,760,033 | 5/1930 | Amsler | 73/99 |
| 2,989,872 | 6/1961 | Dvoracek | 74/99 |

FOREIGN PATENTS OR APPLICATIONS

| 767,260 | 1/1957 | Great Britain | 73/99 |

*Primary Examiner*—Richard C. Queisser
*Assistant Examiner*—Marvin Smollar
*Attorney*—Donald E. Nist and Jay H. Quartz

[57] ABSTRACT

A device for torquing tubes provided with apertured end members comprises, in its simplest embodiment, a pair of lobed, generally-circular plates with each lobed plate having a plurality of radially spaced holes therethrough for connection to the apertured end members of a tube. The lobe portion of each lobes plate is eccentrically positioned with respect to the axis of rotation of that plate to cause rotation of that plate when a force acts against the lobe. Torquing of a tube is accomplished by applying equal forces, e.g., in a press, against the lobes of each lobed plates when the latter are connected to a tube to cause the lobed plates to counter-rotate about a common axis which, in turn, torques the tubes since the tube and lobes plates are fixedely interconnected.

In a preferred embodiment, the lobed plates are provided with axially-aligned apertures which are journaled to receive a shaft in such a way that the plates are maintained in alignment by the shaft but which permits free rotation of the lobed plates about the shaft. Tubes to be torqued are slipped over the shaft before the torquing device is assembled.

4 Claims, 5 Drawing Figures

PATENTED MAY 16 1972

3,662,591

INVENTOR.
IDO A. BONS,

TUBE TORQUING DEVICE

BACKGROUND OF THE INVENTION

This invention relates to torque-producing devices and, more particularly, to devices capable of applying torque loads to tubes.

In the many applications in which tubes are employed as load bearing members, they are often subjected to torque-producing loads. Therefore, in order to enable a designer to effectively design such structures, it is necessary to know the torque loading characteristic of tubes. Such characteristics can be determined by applying torque loads of a known magnitude to tubes in an appropriate test fixture. A common problem in the torque testing of tubes is the existence of loads other than torque-producing loads, for example bending loads, which act on the tubes to prevent the accurate determination of the torque characteristics of the tubes.

Presently-employed tube torquing devices usually employ counter-rotating levers or arms in conjunction with bearings in an attempt to apply a pure torque load. In some devices, the test specimens are fixed at one end, whereas in other devices, the torque producing force is exerted through a cable which is wrapped at one end around a rotating drum and at its other end around the test specimen. A characteristic and disadvantage of the presently-available tube torque test devices is that they are made massive to insure maintenance of alignment of the test components in an attempt to produce pure torque loading. Additionally, the use of bearings to eliminate the application of bending loads to the tubes is seldom fully effective and, furthermore, usually establishes the limit loading of the test device.

SUMMARY OF THE INVENTION

A preferred embodiment of this invention comprises a shaft and a pair of substantially identical lobed discs or plates which are axially journaled to receive the shaft to thereby maintain parallelism of the lobed plates during tube torquing. The lobed plates have a plurality of radially-spaced holes therethrough for mechanical connection to the ends of a tube which is to be torqued.

To torque tubes using the herein-described apparatus, a tube is first provided with apertured end members which are fixedly attached to the tube ends. The tube is then slipped over the shaft and the latter is slipped into the journals in the lobes plates. The lobed plates are positioned so that an applied load acting against the lobes, which are eccentrically positioned with respect to the aligned rotational axes of the lobed plates, causes the lobed plates to rotate about their axes. Interconnection of facing pairs of lobed plates and tube end members is made and then a load is applied against the lobes to cause the lobed plates to counter-rotate to thereby twist or torque the tube.

If the lobed plates can be maintained in parallelism without resorting to a common shaft, the latter, together with the journals in the lobed plates, may be dispensed with.

The herein-described device is capable of applying substantially pure torque loading to a tube. This desirable goal is obtained with a portable, simply-constructed device which is easy to use. Additionally, this device is exceptionally reliable thereby providing high reproducibility of data.

DESCRIPTION OF THE PREFERRED EMBODIMENTS

Figure 1:
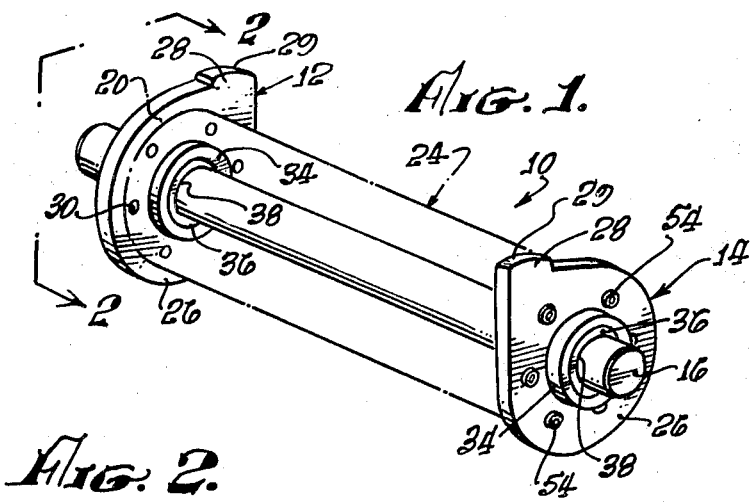
FIG. 1 is a perspective view of a preferred embodiment of this invention showing a tube, in phantom outline, positioned for testing.

In general, the tube torquing device of this invention comprises a pair of lobed discs or plates which are journaled to receive a common shaft to maintain the two lobed plates in parallel alignment. Suitable means are provided to attach or connect the ends of a tube to be torqued to adjacent lobed plates so that torque applied to the lobed plates is transmitted to the tube. A force is applied against the lobes in a manner such that the lobed plates are caused to counter-rotate thereby twisting or torquing the tube.

Describing the preferred embodiment of this invention more specifically, reference is made to the FIGURES in which the numeral 10 designates the preferred embodiment of the herein-described tube torquing device. The device 10 comprises a pair of lobed plates 12,14 which are journaled to receive a common shaft 16. Attachment means are provided to fixedly interconnect the lobed plates 12,14 to adjacent ends 20,22, respectively, of a tube 24 so that rotation of the lobed plates 12,14 is transmitted to the tube 24.

The two lobed plates 12,14 are shown and described as being identical to each other for brevity of description. However, it is only necessary that the size and outer configuration of each lobed plate, be substantially identical to those characteristics of the other. These characteristics of the two lobed plates 12,14 must be substantially identical to ensure that each lobed plate is rotated a substantially equal amount by a force exerted equally on the lobed plates 12,14.

Figure 2:
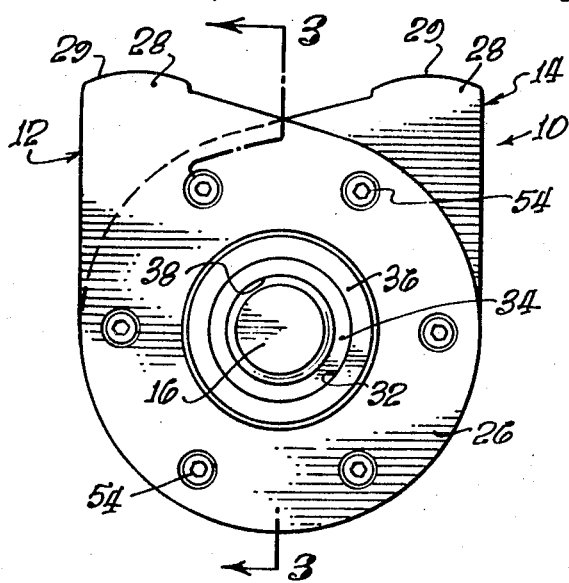
FIG. 2 is an end view of the device of this invention taken along the line 2—2 of FIG. 1.
Figure 3:
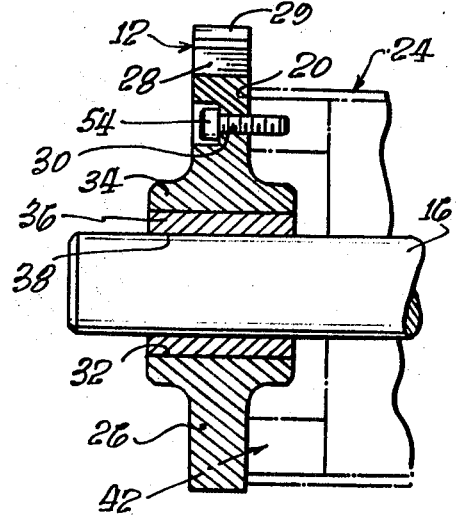
FIG. 3 is a side elevational sectioned view of a lobed plate taken along the line 3—3 of FIG. 2.
Figure 4:
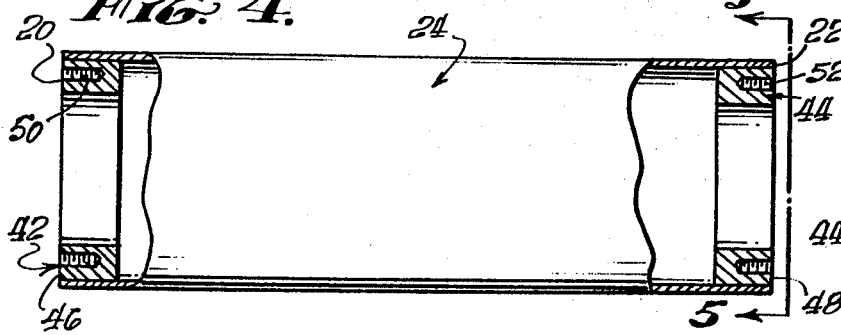
FIG. 4 is a side view of a tube ready for testing in the device of this invention showing both ends in partial section.
Figure 5:
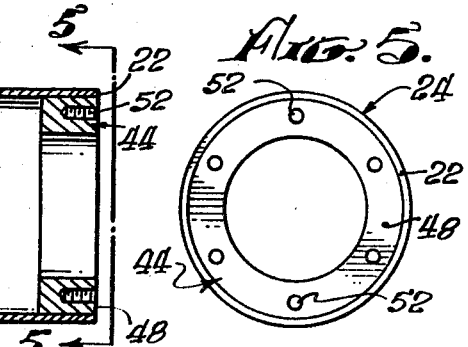
FIG. 5 is an end view of the tube of FIG. 4 taken along the line 5—5 of FIG. 4.

Because of the identity of the two lobed plates 12,14, as shown, only one lobed plate 12 will be described in detail. Referring in particular to FIG. 2 and 3, the lobed plate 12 comprises an essentially circular section or disc 26 with a lobe 28 projecting eccentrically therefrom. The disc portion 26 of the lobed plate 12 is provided with a plurality (two or more) of radially spaced holes 30 extending therethrough. Radial spacing of the holes 30 is arbitrary and may be identical as shown, or for example, one of the holes may be offset a few degrees from the others to serve as a guide. Each of the holes 30 in the disc 26 is positioned equidistant from the center of the disc to ensure uniform application of the torque-producing load to the tube 24.

The disc section 26 is centrally thickened on each side of the lobed plate 12 and an axial aperture 32 extends therethrough to provide a sleeve 34. A bushing 36 which may be bronze is located within the sleeve 34 and defines an axial bore 38 through which the shaft 16 can extend. Other bearing units, e.g. ball bearings mounted in a race, may be substituted for the bushing 36. The bore 38 is sized relative to the diameter of the shaft 16 so that the lobed plates 12,14 are maintained in substantially parallel alignment while leaving the lobed plates 12,14 free to rotate about their common axis with the shaft 16.

The lobe plate 28 has a loading or force-receiving surface 29 against which pressure is applied to cause the lobed plates 12,14 to rotate. In order to obtain valid data, the shape of this loading surface 29 must be such that the load moment arm remains essentially constant. For small angles of rotation, for example, angles of about four degrees or less, the loading surface 29 may be radiused without invalidating the test data since the change in the moment arm will be very small. However, for large angles, the loading surface 29 should conform to a generated curve which will hold the moment arm substantially constant through the angle of rotation of the lobed plates 12,14.

The lobed plates 12,14 may be formed from any material, for example, tool steel, which is capable of carrying the applied loads at line contact without plastic deformation. The lobed plate material may be hardened to reduce frictional forces developed between the rotating lobed plates 12,14 and a work surface on which they are supported. To further aid in reducing these frictional forces, a lubricant may be added to the contacting surfaces.

The shaft 16 may be made from any suitable material such as drill rod. Its length is selected to provide the necessary spacing between lobed plates 12,14 for positioning of the tube 24 therebetween.

The attachment means for interconnecting the tube 24 to the lobed plates 12,14 will now be described. The tube 24 is provided with inserts or end members 42,44 in the form of hollowed cylinders which are bonded to the inner walls of the tube 24 adjacent its ends 20,22, respectively. Bonding is accomplished in a manner well known in the art using any adhesive, e.g., an epoxy, which has sufficient shear strength to ensure breakage or deformation of the tube before bond breakdown. The observable annular face 46,48 of each of the inserts 42,44, respectively, is provided with a plurality of threaded blind holes 50,52, respectively. The blind holes 50,52 have the same configuration and spacing as the holes 30 in the lobed plates 12,14, respectively. Connection of the tube 24 to the lobed plates may be made by bolts 54 passing through the holes 30 in the lobed plates 12,14 and threaded into the aligned blind holes 50,52 in the bonded inserts 42,44, respectively (FIG. 1).

If the same fixture is employed to torque tubing of varying diameters, appropriately sized inserts may be bonded into the tube ends and adaptor plates (not shown) connected thereto and to the lobed plates. Additionally, instead of using bonded inserts, as described, apertured flanges or collars may be bonded to the external surface of a tube for connection to the lobed plates.

To employ the herein-described preferred embodiment of this invention, a tube 24, provided with inserts 42,44 as described, is slipped over the shaft 16, and the ends of the latter are slipped through the bores 38 in the lobed plates 12,14. The lobed plates 12,14 are positioned as shown in FIG. 2 (when using a vertically applied force) and then are connected to adjacent bonded inserts 42,44 using the bolts 54. Pressure is then applied equally against the lobes 28 as shown by arrows in FIG. 2, for example, by placing the device 10 in a press and moving the top platen downwardly against the lobes 28 at known pressures. This causes the lobed plates 12,14 to counter-rotate about their common axis thereby torquing the tube 24. The applied pressure is normally increased until the tube deforms or breaks. Thereafter, the pressure is released and the tube 24 is then separated from the tube torquing device 10 which is then ready for the next test.

After completion of the test, the torque applied to the tubes can be calculated since both the load and the load moment arm are known. However, if there are significant frictional losses due to friction between the contacting surfaces of the lobed plates and the supporting surfaces, the calculated torque must be reduced accordingly.

Thus far, what has been described is a preferred embodiment of this invention in which a shaft is employed to maintain the lobed plates in parallel alignment. However, if the lobed plates will remain in parallel alignment during a test without a shaft or equivalent alignment aid, the latter may be dispensed with. If the shaft is not used, the lobed plates do not need to be provided with an opening or bushing to receive the shaft.

I claim:

1. Apparatus for torquing tubes for use between a pair of force plates, said tubes having end members fixedly attached thereto, comprising:

a pair of lobed discs of substantially the same size and configuration, each lobe of said lobed discs having a force-receiving surface eccentrically positioned with respect to the axis of the disc portion of each said lobed disc for contact with the same one of said force plates to cause each said lobed disc to rotate in a direction opposite the other about said axis when a force acts through said one force plate against said force-receiving surface of said lobe; and connection means for connecting said lobed discs to said end members of said tubes, said lobed discs when so connected counter-rotating when acted upon by said force to thereby oppositely torque the ends of said tubes.

2. The apparatus of claim 1 including, in addition, a shaft of circular cross-section and, wherein each of said lobed discs has formed therein an axially-aligned aperture sized to receive said shaft to maintain alignment of said lobed discs during torquing of said tubes while permitting free rotation of said lobed discs.

3. The apparatus of claim 1 wherein said force-receiving surfaces of said lobes are provided with a curvature such that the moment arm of said force acting against said force-receiving surfaces remains substantially constant during the torquing of said tubes.

4. The apparatus of claim 2 wherein said force-receiving surfaces of said lobes are provided with a curvature such that the moment arm of said force acting against said force-receiving surfaces remains substantially constant during the torquing of said tubes.

* * * * *